3,468,810
METHOD OF MAKING TERBIUM ACTIVATED
ALKALINE EARTH SILICATE PHOSPHORS
Hideo Mizuno, Takatsuki-shi, Japan, assignor to Matsushita Electronics Corporation, Osaka, Japan, a corporation of Japan
Filed Mar. 21, 1966, Ser. No. 536,098
Claims priority, application Japan, Mar. 26, 1965,
40/17,955
Int. Cl. C09k 1/54
U.S. Cl. 252—301.4      21 Claims

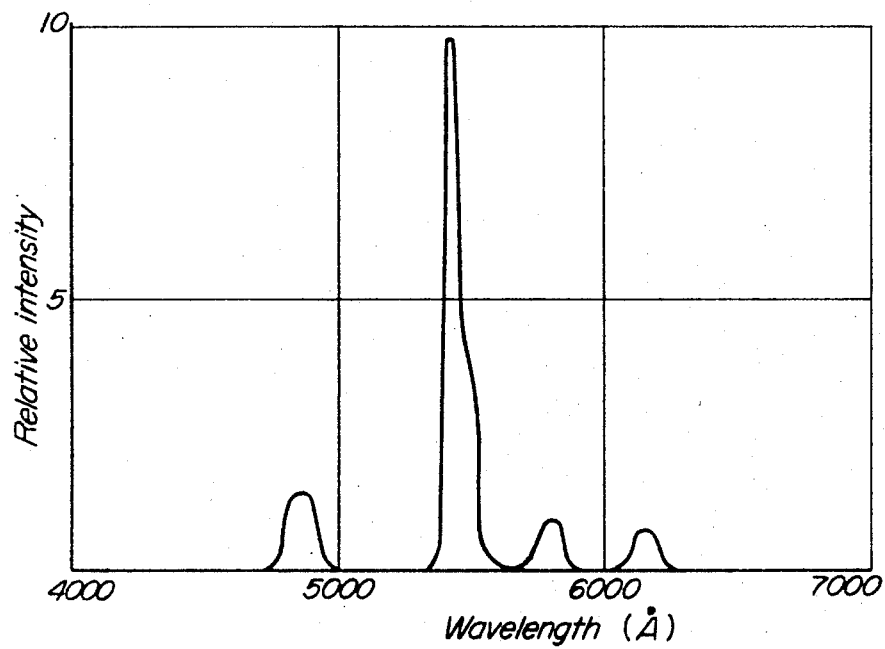

ABSTRACT OF THE DISCLOSURE

A method of preparing terbium-activated phosphors of alkaline-earth silicates having improved properties from the standpoint of brightness and freedom of coloring due to the presence of free terbium oxide, by adding boric acid in the firing process as a flux in an amount of 0.02 to 0.06 mol of boric acid per mol of alkaline-earth silicate.

---

This invention relates to terbium-activated silicate phosphors and more particularly to a method of making such phosphors of improved properties by adding a flux before the firing of the phosphor.

The primary object of the present invention is to provide an improved method of making phosphors of the type described, resulting in higher brightness and freedom of any coloring due to the presence of free terbium oxide.

The above and other objects, advantages and features of the present invention will become more apparent as the description further proceeds.

It is known that terbium-activated silicate phosphors show a weak green emission under 3650 A. ultraviolet ray excitation but these phosphors do not show any substantial emission under 2537 A. ultraviolet ray excitation. Moreover, when terbium is added in an amount of the order of 0.03 gram atom per gram atom of the metal component of the silicate, these phosphors are slightly colored to dark gray and do not show a high brightness. Typical alkaline-earth silicate phosphors include such components as calcium metasilicate, calcium ortho-silicate and barium silicate or/and strontium silicate. As known, these phosphors are normally made by firing alkaline-earth carbonate and colloidal silica. Even when the phosphors are fired for a long period of time at elevated temperature, some of the materials do not react sufficiently to yield the desired phosphors. Especially when terbium is used as an activator for these phosphors, terbium diffusion into the host material takes place very difficultly and $Tb_4O_7$, which is the raw material used, may remain in its original state, thereby giving rise to coloring of the phosphor.

According to the discovery of the inventors, these terbium-activated silicate phosphors can be made quite free from any coloring due to the presence of non-reacted terbium and such that they show a brilliant green emission under excitation with 2537 A. and 3650 A. ultraviolet rays when boric acid is added to the phosphors as a flux during firing of the phosphors.

More precisely, addition of 2 to 6% by mol boric acid to these phosphors during firing is effective for increasing the speed of the reaction and moreover the phosphors fired for 2 to 3 hours at a temperature of 1150° to 1200° C. are free from any coloring and show a high brightness.

Calcium metasilicate being one form of calcium silicate appears in two types, α-type and β-type, and it is the β-type which is effective as a host material for the phosphors presently considered. In pure calcium metasilicate, transition from the β-type to the α-type takes place at temperatures above 1125° C., but this transition can be avoided by substitution of part of the calcium in calcium metasilicate by a metal element whose ionic radius is smaller than that of calcium. Known calcium silicate phosphors are activated with lead and manganese, and in this case a part of the calcium therein is substituted by manganese having an ionic radius of 0.91 A. which is smaller than the ionic radius 1.06 A. of calcium. In the known calcium silicate phosphors therefore, the β-type can be obtained even when these phosphors are fired at 1150° to 1200° C. However, in the calcium silicate phosphors which are activated with an element such as terbium having an ionic radius of 1.09 A. which is larger than the ionic radius 1.06 A. of calcium, it is necessary to substitute a part of calcium by an element such as magnesium, which has a smaller ionic radius than calcium, so that also in this case the phosphors can be fired at temperature of the order of 1150° to 1200° C., necessary to get a sufficiently high brightness of the phosphors and effective prevention of the transition from the β-type into the α-type. Accordingly, the terbium-activated calcium metasilicate phosphor should have a composition formula such as for instance $$0.77CaO \cdot O \cdot 2MgO \cdot SiO_2 : 0.03Tb$$

However, a phosphor of this composition is still colored by free terbium oxide and only shows a weak emission even when fired for 2 to 4 hours at 1150° to 1200° C.

To eliminate the above drawbacks, an addition of more than 2% by mol boric acid to the above-described silicate during firing is very effective and any coloring due to free terbium oxide is substantially eliminated and the brightness of the phosphor is increased substantially. Addition of boric acid should be limited preferably to a range of 2 to 6% by mol. Addition of more than 6% by mol boric acid gives rise during firing to an undesirable sintering and crystal grain growth beyond acceptable limits. In order to get complete elimination of coloring due to free terbium oxide and to obtain maximum brightness, boric acid addition of 3 to 4% by mol is most preferable.

In the accompanying drawing, the graph figure shows the energy distribution of the phosphor made by the method according to the invention.

In case of barium silicate, best results can be obtained by firing a phosphor composition represented by $BaO \cdot 2SiO_2 : 0.03Tb \cdot 0.04B$. Similar arguments apply also for strontium silicate and for possible combinations of different alkaline-earth metal silicates. In these cases also, boric acid addition of 2 to 6% by mol are to be preferred for complete elimination of any coloring due to free terbium oxide and for obtaining maximum brightnesses. The amount of terbium addition to the above-described silicates is preferably of the order of 0.005 to 0.06 gram atom per gram atom of the alkaline-earth metal components. Terbium addition in amounts smaller than or larger than the above limit is objectionable, because terbium addition of less than 0.005 gram atom per gram atom of the alkaline-earth metal component results in an insufficient brightness, whereas terbium additions of more than 0.06 gram atom result in coloring of the phosphor and in lowering in its brightness. The range between 0.01 and 0.04 gram atom is to be most preferred.

A few specific examples of phosphors made by the method according to the present invention will now be described.

EXAMPLE 1

| Raw-mix constituents: | Amounts (mols) |
|---|---|
| Calcium carbonate ($CaCO_3$) | 0.8 |
| Magnesium oxide (MgO) | 0.2 |
| Silicon dioxide ($SiO_2$) | 1 |
| Terbium oxide ($Tb_4O_7$) | 0.0075 |
| Boric acid ($H_3BO_3$) | 0.04 |

The above-described components are thoroughly mixed together and the mixture is fired for 2 to 4 hours at 1150° to 1200° C. The phosphor thus prepared shows brilliant green emission under excitation with 2537 A. and 3650 A. ultraviolet rays. Its relative intensity vs. wavelength characteristic is as shown in the accompanying drawing.

EXAMPLE 2

Raw-mix constituents:                  Amounts (mols)
    Barium carbonate ($BaCO_3$) _____   1
    Silicon dioxide ($SiO_2$) _____   2
    Terbium oxide ($Tb_4O_7$) _____   0.0075
    Boric acid ($H_3BO_3$) _____   0.04

The above-described components are thoroughly mixed together and the mixture is fired for 2 to 4 hours at 1150° to 1200° C. The phosphor thus prepared shows brilliant green emission under excitation with 2537 A. and 3650 A. ultraviolet rays. Its relative intensity vs. wavelength characteristic is substantially similar to that of Example 1.

EXAMPLE 3

Raw-mix constituents:                  Amounts (mols)
    Strontium carbonate ($SrCO_3$) _____   1
    Silicon dioxide ($SiO_2$) _____   1
    Terbium oxide ($Tb_4O_7$) _____   0.0075
    Boric acid ($H_3BO_3$) _____   0.04

The above-described components are thoroughly mixed together and the mixture is fired for 2 to 4 hours at 1150° to 1200° C. The phosphor thus prepared shows brilliant green emission under excitation with 2537 A. and 3650 A. ultraviolet rays. Its relative intensity vs. wavelength characteristic is substantially similar to that of Example 1.

EXAMPLE 4

Raw-mix constituents:                  Amounts (mols)
    Calcium carbonate ($CaCO_3$) _____   1
    Silicon dioxide ($SiO_2$) _____   1
    Terbium oxide ($Tb_4O_7$) _____   0.0075
    Boric acid ($H_3BO_3$) _____   0.04

The above-described components are thoroughly mixed together and the mixture is fired for 2 to 4 hours at 1150° to 1200° C. The phosphor thus prepared shows brilliant green emission under excitation with 2537 A. and 3650 A. ultraviolet rays. Its relative intensity vs. wavelength characteristic is substantially similar to that of Example 1.

EXAMPLE 5

Raw-mix constituents:                  Amounts (mols)
    Barium carbonate ($BaCO_3$) _____   0.8
    Strontium carbonate ($SrCO_3$) _____   0.2
    Silicon dioxide ($SiO_2$) _____   2
    Terbium oxide ($Tb_4O_7$) _____   0.0075
    Boric acid ($H_3BO_3$) _____   0.04

The above-described components are thoroughly mixed together and the mixture is fired for 2 to 4 hours at 1150° to 1200° C. The phosphor thus prepared shows brilliant green emission under excitation with 2537 A. and 3650 A. ultraviolet rays. Its relative intensity vs. wavelength characteristic is substantially similar to that of Example 1.

EXAMPLE 6

Raw-mix constituents:                  Amounts (mols)
    Calcium carbonate ($CaCO_3$) _____   1.5
    Strontium carbonate ($SrCO_3$) _____   0.5
    Silicon dioxide ($SiO_2$) _____   1
    Terbium oxide ($Tb_4O_7$) _____   0.0075
    Boric acid ($H_3BO_3$) _____   0.04

The above-described components are thoroughly mixed together and the mixture is fired for 2 to 4 hours at 1150° to 1200° C. The phosphor thus prepared shows brilliant green emission under excitation with 2537 A. and 3650 A. ultraviolet rays. Its relative intensity vs. wavelength characteristic is substantially similar to that of Example 1.

What is claimed is:

1. A method of preparing phosphors mainly consisting of at least one of the alkaline-earth silicates, calcium meta silicate, calcium ortho silicate, barium silicate and strontium silicate, which phosphor is activated by terbium, characterized by using boric acid in the firing process as a flux, where the ratio of mols of boric acid to mols of alkaline-earth silicates is between 0.02:1 and 0.06:1.

2. A method of preparing phosphors mainly consisting of at least one of the alkaline-earth silicates, calcium meta silicate, calcium ortho silicate, barium silicate and strontium silicate, which phosphor is activated by terbium, characterized by using boric acid in the firing process as a flux, where the ratio of mols of boric acid to mols of alkaline-earth silicates is between 0.02:1 and 0.06:1 and in which said terbium is added in a ratio of atoms in relation to the atoms of alkaline-earth between 0.005:1 and 0.06:1.

3. A method of preparing phosphors mainly consisting of at least one of the alkaline-earth silicates, calcium meta silicate, calcium ortho silicate, barium silicate and strontium silicate, which phosphor is activated by terbium, characterized by using boric acid in the firing process as a flux, where the ratio of mols of boric acid to mols of alkaline-earth silicates is between 0.02:1 and 0.06:1 and in which said terbium is added in a ratio of atoms in relation to the atoms of alkaline-earth between 0.01:1 and 0.04:1.

4. A method of preparing phosphors as claimed in claim 1, wherein said alkaline-earth silicate is barium silicate.

5. A method of preparing phosphors as claimed in claim 2, wherein said alkaline-earth silicate is barium silicate.

6. A method of preparing phosphors as claimed in claim 3, wherein said alkaline-earth silicate is barium silicate.

7. A method of preparing phosphors as claimed in claim 1, wherein said alkaline-earth silicate is strontium silicate.

8. A method of preparing phosphors as claimed in claim 2, wherein said alkaline-earth silicate is strontium silicate.

9. A method of preparing phosphors as claimed in claim 3, wherein said alkaline-earth silicate is strontium silicate.

10. A method of preparing phosphors as claimed in claim 1, wherein said alkaline-earth silicate is calcium ortho-silicate.

11. A method of preparing phosphors as claimed in claim 2, wherein said alkaline-earth silicate is calcium ortho-silicate.

12. A method of preparing phosphors as claimed in claim 3, wherein said alkaline-earth silicate is calcium ortho-silicate.

13. A method of preparing phosphors as claimed in claim 1, wherein said alkaline-earth silicate is calcium meta-silicate.

14. A method of preparing phosphors as claimed in claim 2, wherein said alkaline-earth silicate is calcium meta-silicate.

15. A method of preparing phosphors as claimed in claim 3, wherein said alkaline-earth silicate is calcium meta-silicate.

16. A method of preparing phosphors mainly consisting of at least one of the alkaline-earth silicates, calcium meta silicate, calcium ortho silicate, barium silicate and strontium silicate, which phosphor is activated by terbium, characterized by using boric acid in the firing process as a flux, where the ratio of mols of boric acid to mols of alkaline-earth silicates is between 0.02:1 and 0.06:1, in which said alkaline-earth silicate is a solid solution of strontium and barium silicates.

17. A method of preparing phosphors mainly consisting of at least one of the alkaline-earth silicates, calcium meta silicate, calcium ortho silicate, barium silicate and strontium silicate, which phosphor is activated by terbium, characterized by using boric acid in the firing process as a flux, where the ratio of mols of boric acid to mols of alkaline-earth silicates is between 0.02:1 and 0.06:1 and in which said terbium is added in a ratio of atoms in relation to the atoms of alkaline-earth between 0.005:1 and 0.06:1, in which said alkaline-earth silicate is a solid solution of strontium and barium silicate.

18. A method of preparing phosphors mainly consisting of at least one of the alkaline-earth silicates, calcium meta silicate, calcium ortho silicate, barium silicate and strontium silicate, which phosphor is activated by terbium, characterized by using boric acid in the firing process as a flux, where the ratio of mols of boric acid to mols of alkaline-earth silicates is between 0.02:1 and 0.06:1 and in which said terbium is added in a ratio of atoms in relation to the atoms of alkaline-earth between 0.01:1 and 0.04:1, in which said alkaline-earth silicate is a solid solution of strontium and barium silicates.

19. A method of preparing phosphors mainly consisting of at least one of the alkaline-earth silicates, calcium meta silicate, calcium ortho silicate, barium silicate and strontium silicate, which phosphor is activated by terbium, characterized by using boric acid in the firing process as a flux, where the ratio of mols of boric acid to mols of alkaline-earth silicates is between 0.02:1 and 0.06:1, in which said said alkaline-earth silicate is a solid solution of calcium ortho silicate and strontium ortho silicate.

20. A method of preparing phosphors mainly consisting of at least one of the alkaline-earth silicates, calcium meta silicate, calcium ortho silicate, barium silicate and strontium silicate, which phosphor is activated by terbium, characterized by using boric acid in the firing process as a flux, where the ratio of mols of boric acid to mols of alkaline-earth silicates is between 0.02:1 and 0.06:1 and in which said terbium is added in a ratio of atoms in relation to the atoms of alkaline-earth between 0.005:1 and 0.06:1, in which said alkaline-earth silicate is a solid solution of calcium ortho silicate and strontium ortho silicate.

21. A method of preparing phosphors mainly consisting of at least one of the alkaline-earth silicates, calcium meta silicate, calcium ortho silicate, barium silicate and strontium silicate, which phosphor is activated by terbium, characterized by using boric acid in the firing process as a flux, where the ratio of mols of boric acid to mols of alkaline-earth silicates is between 0.02:1 and 0.06:1 and in which said terbium is added in a ratio of atoms in relation to the atoms of alkaline-earth between 0.01:1 and 0.04:1, in which said alkaline-earth silicate is a solid solution of calcium ortho silicate and strontium ortho silicate.

References Cited
UNITED STATES PATENTS 2,124,225  7/1938  Batchelor.

FOREIGN PATENTS 781,127  8/1957  Great Britain.

TOBIAS E. LEVOW, Primary Examiner

R. D. EDMONDS, Assistant Examiner